United States Patent
Mayr et al.

(10) Patent No.: US 9,011,220 B2
(45) Date of Patent: Apr. 21, 2015

(54) TRACTOR CAB HEATING AND VENTILATING SYSTEMS

(75) Inventors: Stefan Mayr, Bobing (DE); Alexander Zeller, Fussen (DE); Hermann Geiss, Marktoberdorf (DE); Andreas Stieglitz, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 830 days.

(21) Appl. No.: 13/124,972

(22) PCT Filed: Oct. 26, 2009

(86) PCT No.: PCT/EP2009/064058
§ 371 (c)(1),
(2), (4) Date: Jun. 22, 2011

(87) PCT Pub. No.: WO2010/049381
PCT Pub. Date: May 6, 2010

(65) Prior Publication Data
US 2011/0250832 A1  Oct. 13, 2011

(30) Foreign Application Priority Data

Oct. 27, 2008  (GB) .................................. 0819560.4

(51) Int. Cl.
*F24F 7/00* (2006.01)
*B60H 1/26* (2006.01)
*B62D 27/02* (2006.01)
(Continued)

(52) U.S. Cl.
CPC ........ *B62D 33/0617* (2013.01); *B60H 1/00378* (2013.01); *B60H 3/0608* (2013.01); *B60H 2001/00221* (2013.01); *B60H 2003/065* (2013.01)

(58) Field of Classification Search
USPC .............................. 454/237, 139; 296/191, 28
IPC .............. B60H 1/00378,3/0608; B62D 33/0617
See application file for complete search history.

(56) References Cited

U.S. PATENT DOCUMENTS 3,924,524 A * 12/1975 Whisler ........................ 454/161
4,072,487 A    2/1978 Irwin
(Continued)

FOREIGN PATENT DOCUMENTS

JP    08108741 A    4/1996

OTHER PUBLICATIONS

International Search Report for PCT/EP2009/064058 dated Mar. 1, 2010.
(Continued)

*Primary Examiner* — Steven B McAllister
*Assistant Examiner* — Helena Kosanovic (57) ABSTRACT

A tractor cab HVAC system has a blower (22) which draws air into the system via air intake means (13) in the roof (14) of the cab (10). Ducting (15) in the roof of the cab directs air drawn in via the intake means down the center of one or more hollow adjacent pillars (16) of the cab to an air filter (18) contained in a housing (20) located between the adjacent pillars. Further ducting (19) extends from the air filter housing to an HVAC unit (11), the HVAC unit processing the air drawn into the system prior to discharging the processed air into the cab. The filter housing (20) is of generally rectangular form and is connected at opposite ends to the two hollow adjacent pillars (16) of the cab via inlet openings (20a) in the housing to allow the passage of intake air from the pillars to the filter (18).

7 Claims, 13 Drawing Sheets

(51) Int. Cl.
*B62D 33/06* (2006.01)
*B60H 1/00* (2006.01)
*B60H 3/06* (2006.01)

(56) References Cited

U.S. PATENT DOCUMENTS

| | | | |
|---|---|---|---|
| 4,088,364 A | 5/1978 | Termont | |
| 4,191,543 A * | 3/1980 | Peters | 96/223 |
| 4,344,356 A | 8/1982 | Casterton | |
| 4,531,453 A * | 7/1985 | Warman et al. | 454/139 |
| 4,935,129 A * | 6/1990 | Wang | 210/131 |
| 5,119,718 A | 6/1992 | Wagner et al. | |
| 5,308,279 A * | 5/1994 | Grinberg | 454/139 |
| 5,951,729 A * | 9/1999 | Ernst et al. | 55/498 |
| 6,231,630 B1 * | 5/2001 | Ernst et al. | 55/385.3 |
| 6,322,111 B1 * | 11/2001 | Brady | 285/370 |
| 2007/0044492 A1 * | 3/2007 | Ichikawa et al. | 62/239 |

OTHER PUBLICATIONS

UK Search Report for GB0819560.4 dated Dec. 16, 2009.

* cited by examiner

TRACTOR CAB HEATING AND VENTILATING SYSTEMS

This invention relates to tractor cab heating, ventilating and air conditioning (HVAC) systems in which air to be distributed to the inside of the cab is drawn into the system by a blower of a so-called HVAC unit via an air intake and air filter.

The term "HVAC system" or "HVAC unit" as used throughout this patent application is to be interpreted as covering a system or unit which at its simplest simply draws air in via the filter and distributes this filtered air to the inside of the cab or a system or unit which additional heats and/or conditions the air which is drawn in via the filter.

Such HVAC systems are well known and in dusty areas can involve changing or cleaning the filter several times a day in order to maintain the necessary air quality in the cab.

Thus it is desirable for the filter to be readily accessible for easy replacement or cleaning. Also, traditionally such systems have involved the connection of the air intake and the HVAC unit via ducting which is both expensive to provide and difficult to install.

It is an object of the present invention to provide a tractor cab HVAC system unit which allows easy filter maintenance and reduces the amount of ducting required.

A tractor cab HVAC system having a blower which draws air into the system via air intake means in the roof of the cab, ducting in the roof of the cab which directs air drawn in via the intake means down the centre of one or more hollow adjacent pillars of the cab to an air filter contained in housing located between the adjacent pillars, further ducting extending from the air filter housing to an HVAC unit, the HVAC unit processing the air drawn into the system prior to discharging the processed air into the cab, the filter housing being of generally rectangular form and extending across the cab below the rear window of the cab and being connected at opposite ends to bottom ends of two rear hollow adjacent pillars of the cab via inlet openings in the housing to allow the passage of intake air from the pillars to the filter, the filter housing also having a door through which the filter can be accessed for maintenance.

As will be appreciated, by using the hollow rear pillars of the cab to duct the air from the roof intake to the HVAC unit the length of ducting required is reduced and a single filter can be utilised which is located between the pillars and which has easy access by, for example, opening a rear window of the cab and check or clean the filter. By locating the filter between rear pillars a very long filter can be used with high dust capacity but the shallow height (seen from rear) so the visibility through rear window is not worsened.

A sealing means preferably surrounds each inlet opening in the filter housing and seals the housing to air outlets in the hollow adjacent pillars of the cab.

Preferably the filter is clamped against a sealing surface which surrounds an outlet aperture of the filter housing.

Preferably a frame clamps a circumferential seal on the filter against the sealing surface.

The housing is preferably formed as a plastics moulding in accordance with the Applicants co-pending Patent Application No. GB0819632.1.

The bottom ends of the hollow rear pillars of the cab may have outlets through which water and dust/debris which is drawn in via the intake means can be emptied from the pillars.

The outlets may be closed off by flexible sealing teats or spring-loaded flap valves which are normally held closed by the suction effect of the blower and which are opened if the weight of the water, dust or other debris which has collected above the teats or flap valves exceeds the elastic strength of the teats or the spring loading of the flaps. Also if the cab door is closed quickly (slammed) the air pressure impulse created will be arranged to open the teats or flap valves.

On leaving the HVAC unit the air may pass through a hollow floor of the cab before entering the cab via outlets in the floor of the cab.

The present invention will now be described, by way of example only, with reference to the accompanying drawings in which: —

Figure 1:
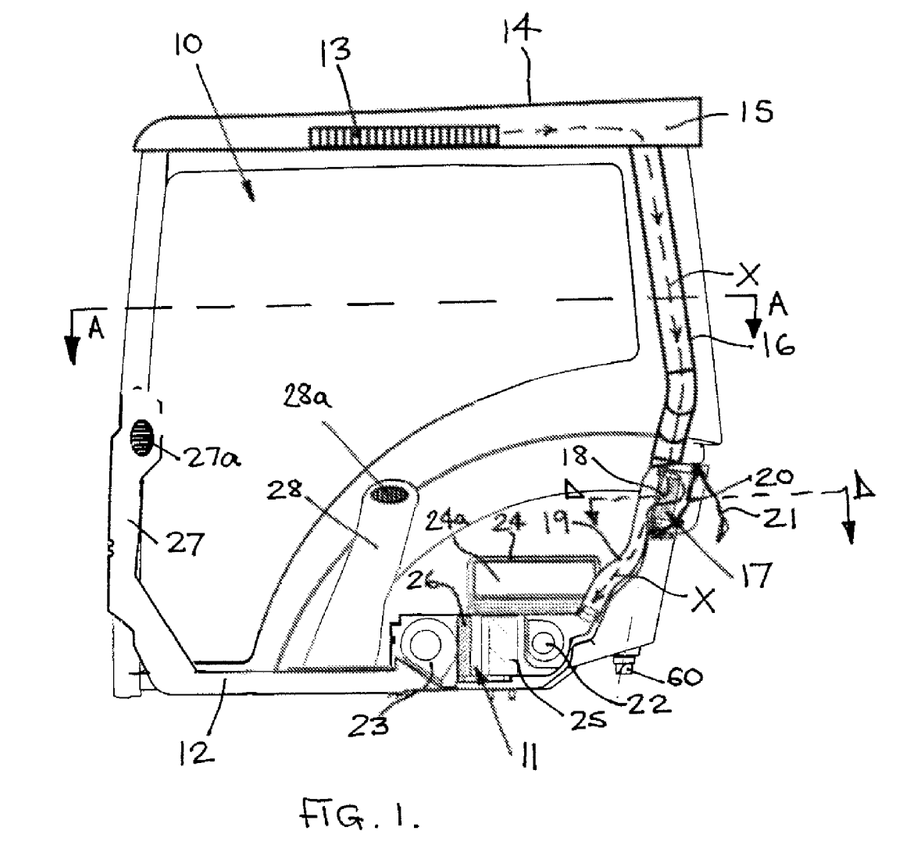
FIG. 1 shows a side view, partly in section, of a tractor cab having an HVAC system in accordance with the present invention.

In accordance with the present invention a tractor cab 10 has a HVAC unit 11 mounted on the floor 12 of the cab. Air intakes 13 are provided in the sides of the roof 14 of the cab through which air is drawn into the HVAC unit 11 via ducts 15 in the roof and both hollow rear pillars 16 of the ROPS (Roll Over Protection Structure) of the cab and through a fresh air filter unit 17 which contains a filter element 18 into a duct 19 connected with the intake of the HVAC unit 11. A cross member 100 extends between the pillars 16. By drawing air into the system via intakes 13 in the roof the level of dust and dirt in the intake air is minimised. The air flow from intakes 13 to the HVAC unit 11 is shown by the dotted line paths X in FIGS. 1 and 2.

The air enters filter unit 17 generally horizontally from both sides. The air filter unit has a housing 20 provided with an opening access door 21 enabling the operator to access the filter element 18 for maintenance or renewal.

FIGS. 12 to 15 show the filter housing 20 which has an inlet opening 20a which is sealed at 65 to an outlet 66 provided in the adjacent cab pillar 16. The filter housing 20 and access door 21 may be formed as a hollow plastics blow moulding as described and claiming in the Applicant's co-pending UK Patent Application no. GB0819632.1.

The structural pillar 16 is surrounded by sheet metal or plastics panel work 67 which includes a rear external panel 68 of the cab. In the arrangement shown in FIGS. 12 to 15, the air filter 18 includes a peripheral sealing area 18a which is clamped against a portion 68a of the rear panel 68, which surrounds an output aperture 19a formed in the rear panel 68 of the cab, by a frame 69 and an associated wing nut 70 which engages bolts 71 welded to the rear panel 68. Aperture 19a leads to duct 19.

Figure 16:
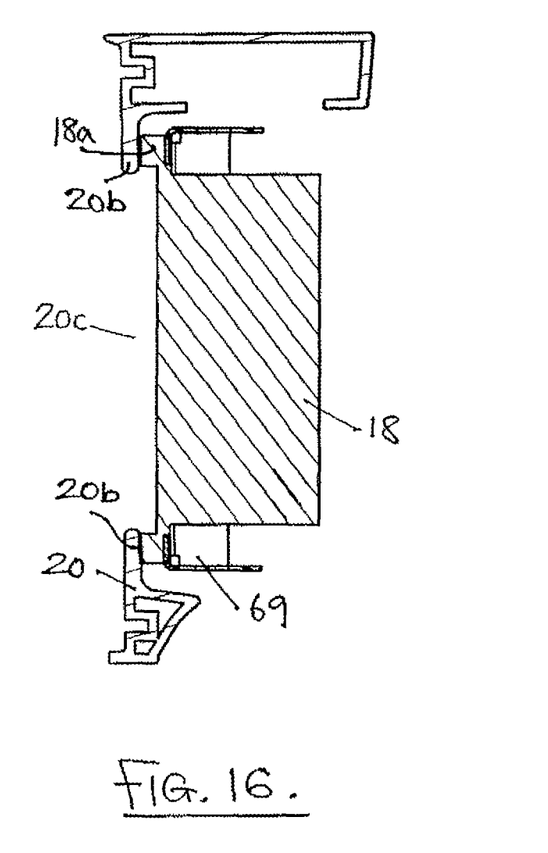
FIG. 16 shows a section on the line F-F of FIG. 12 of part of an alternative filter housing construction.

In an alternative arrangement, shown in FIG. 16, the filter 18 is clamped against a filter mounting surface 20b which surrounds an output aperture 20c in the housing 20 leading to duct 19.

The HVAC unit 11 includes a pressurization blower 22 to overcome the pressure drop caused by the long air intake path X, which is somewhat restrictive due to being narrow and including various bends. A main blower 23 is also provided to push air from the HVAC unit 11 into the cab, to draw air through an evaporator 25 and heater core 26 and to suck air into the unit via recirculation ducts 24 via path Y. Main blower 23 is not provided to suck the air into the HVAC unit along intake path X. Without the pressurization blower 22, the air flow from the HVAC unit would be too small for reasonable system performance.

The heater core 26 is provided with an electronically controlled valve (not shown) for regulating the mass flow and therefore the heating performance of the heater core 26. The evaporator is also equipped with an evaporator valve (not shown) for vaporizing the refrigerant and protecting the evaporator from unwanted icing. Additionally the overall control unit for the HVAC system can be housed within a housing 40 of the HVAC unit 11. The HVAC unit 11 also has an external central electric connector for all the electrical connections of the unit thus providing easy plug and play installation of the HVAC unit.

The main blower 23 distributes air from the HVAC unit to a front distributor 27 to provide air to defrost/defog the front screen and front windows of the cab and also provide processed air for the driver. Fender distributors 28 on the left and right fender provide air to the side windows of the cab and also to the side of the driver. All these distributors 27 and 28 are equipped with nozzles 27a and 28a respectively to control the air distribution within the cab. These nozzles can be adjustable and/or closed by hand.

Figure 5:
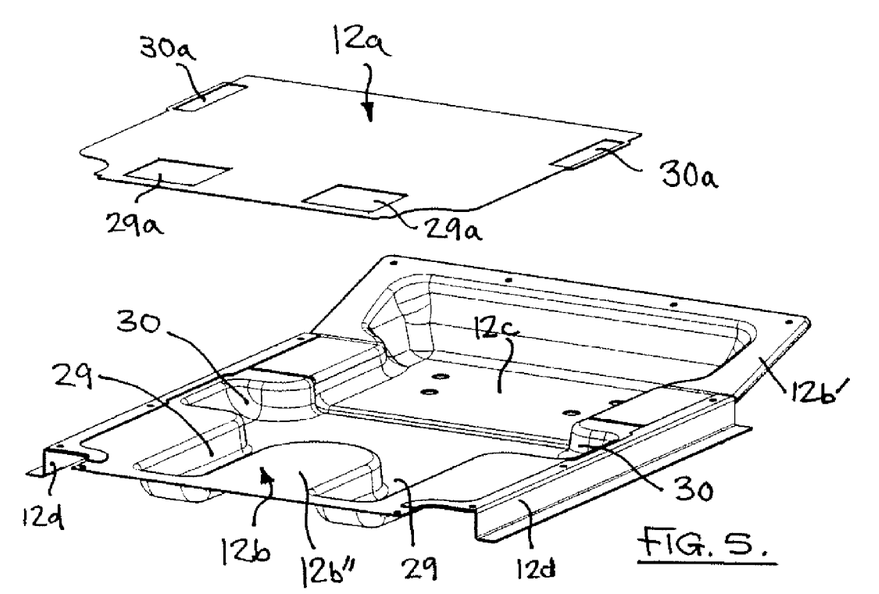
FIG. 5 shows an exploded perspective view of the two layer cab floor.
Figure 6:
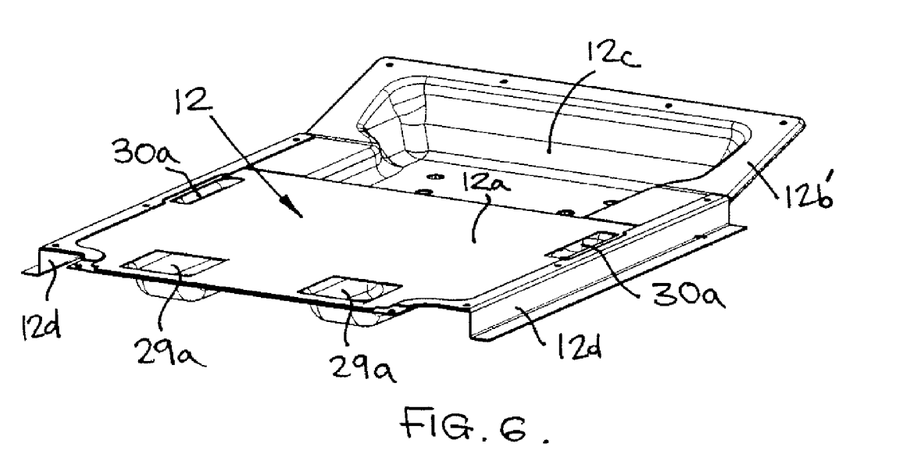
FIG. 6 shows the floor of Figure assembled.
Figure 7:
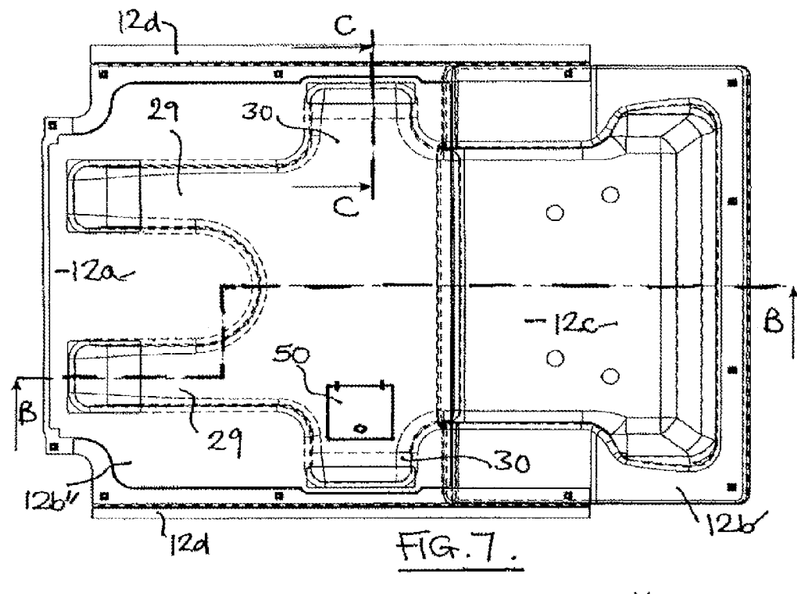
FIG. 7 shows a plan view of the floor of FIGS. 5 and 6.
Figure 8:
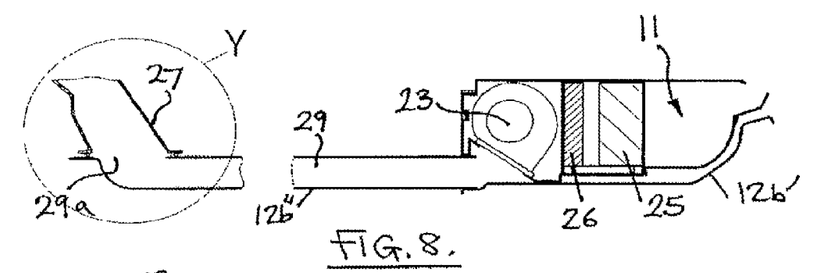
FIG. 8 shows a section on the line B-B of FIG. 7.
Figure 9:
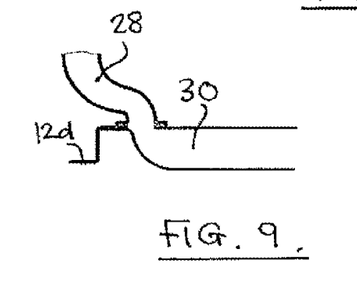
FIG. 9 shows a section on the line C-C of FIG. 7.
Figure 10:
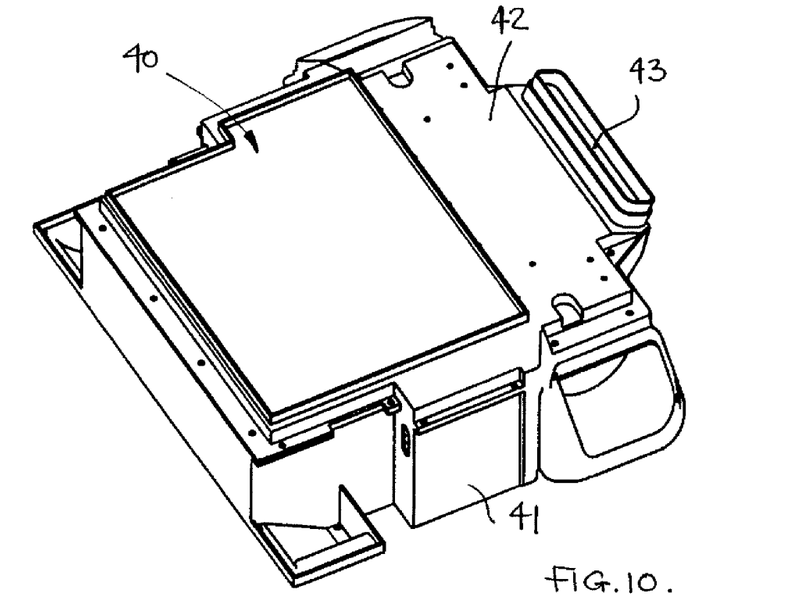
FIG. 10 shows a perspective view of an HVAC unit used in conjunction with the present invention.
Figure 11:
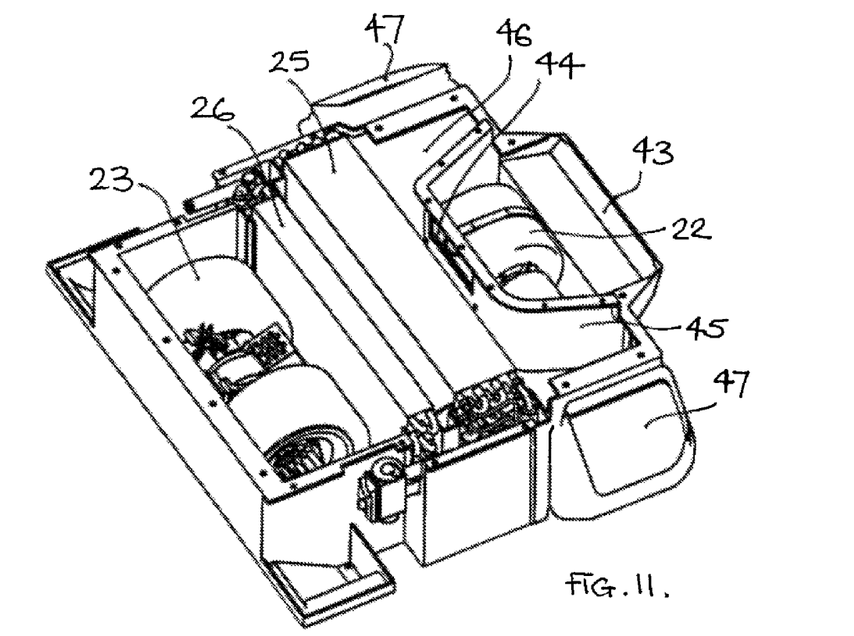
FIG. 11 shows the heating/ventilating unit of FIG. 10 with its cover removed for clarity.
Figure 12:
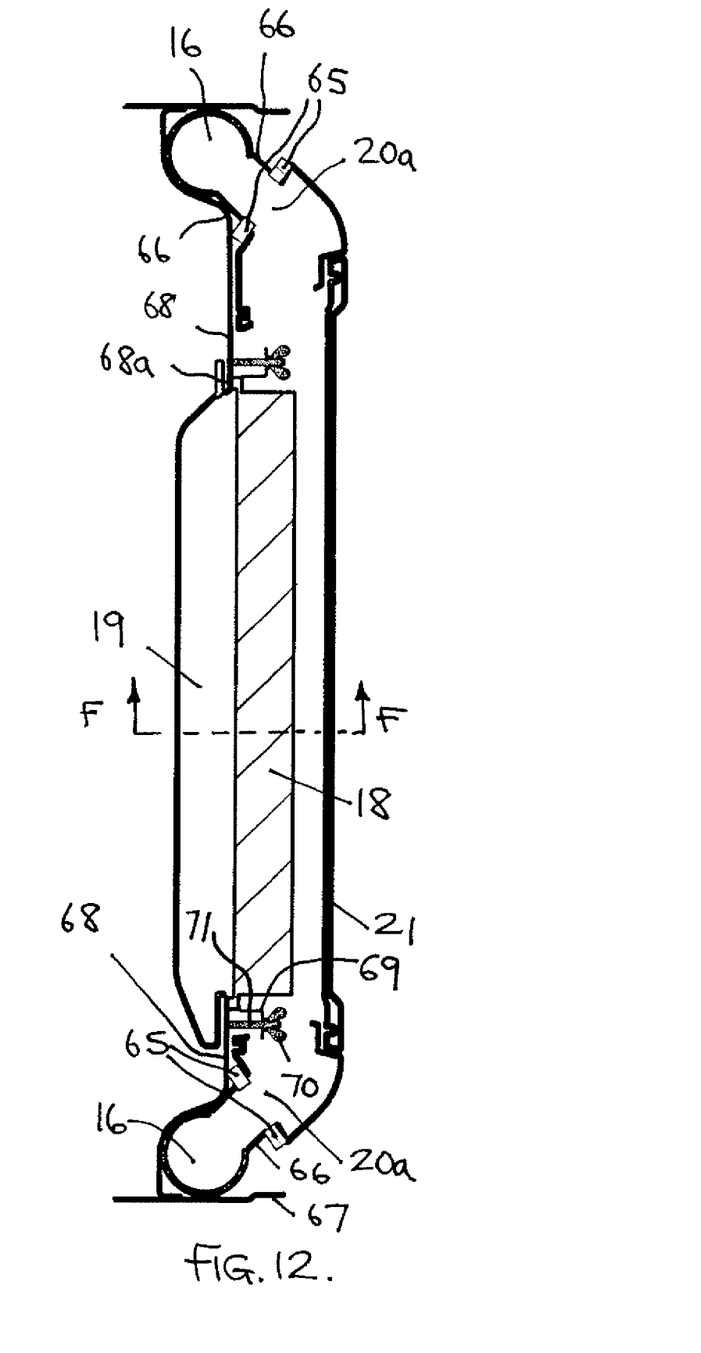
FIG. 12 shows a section on the line D-D of FIG. 1.
Figure 13:
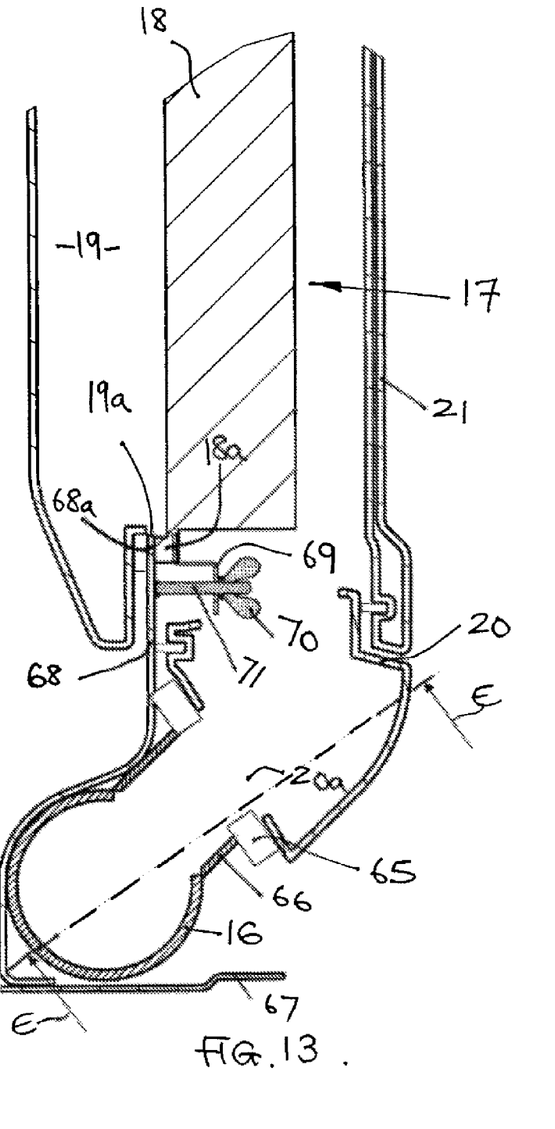
FIG. 13 shows part of FIG. 12 on a larger scale.

In accordance with the Applicant's co-pending UK Patent Application No. GB0819562.0, the HVAC unit 11 is connected with the distributors 27 and 28 by cavities in the form of passages 29 and 30 formed in the hollow floor 12 of the cab (see FIG. 5). It is a main task of these passages in the floor to transport the air from the HVAC unit with a minimum of pressure drop and noise emission. The floor 12 comprises an upper layer 12a and a lower layer 12b which are welded and sealed together to provide the necessary structural integrity of the floor and to seal the sides of the passages 29 and 30 (see FIG. 6). The HVAC unit 11 is mounted in a recess 12c provided in the rear portion 12b' of the lower layer 12b of the floor. As most clearly visible in FIG. 8, the rear portion 12b' of the lower layer 12b of the floor is a separate component which is welded or otherwise secured to the front portion 12b'' of the lower layer. This facilitates manufacture of the lower layer 12b. Flanges 12d are welded or otherwise secured to the sides of lower layer 12b for securing the floor of the other structural portions of the cab. The upper layer 12a has outlets 29a and 30a which connect passages 29 and 30 with distributors 27 and 28 respectively as shown in FIGS. 8 and 9.

The floor layer 12a and 12b may be made from steel sheets which or can be made from reinforced plastics material which is glued or otherwise secured together.

The cavities formed between the floor layers 12a and 12b can also or alternatively be used to run electric wiring or hydraulic pipes or hoses through and/or for the storage of fluids such as screen washer liquid. One or more access hatches 50 are provided in the upper layer 12a of the floor to give access to the cavity between the floor layers. These hatches are accessible via access flaps in a rubber mat (not shown) which extends over the upper layer 12a of the floor.

The HVAC unit 11 has a housing 40 with is preferably injection moulded and has a lower part 41 and a cover 42.

The fresh air from filter unit 17 is drawn into the HVAC unit 11 via fresh air intake 43 by the pressurization blower 22 and pushed, via an aperture 44 in a partition wall 45, into a reservoir chamber 46 which is placed ahead of the evaporator 25.

Due to the suction effect caused by main blower 23, air is also sucked via recirculation intakes 47 in the housing 40 on both sides of the HVAC unit 11 into the reservoir chamber 46. Recirculation intakes 47 are connected with ducts 24.

Both fresh air and also recirculation air are sucked into the HVAC unit in order to reduce the time to reach the cab temperature set-point and thus increase the performance of the system.

Also, in an area with unpleasant odours recirculation air is chosen to reduce smell nuisance.

Each duct 24 is provided with the recirculation air filter element 24a is placed to the side of the cab seat near the fenders. These filters must also be readily removeable for maintenance.

The fresh air and recirculation air flows are mixed in the reservoir chamber 46 and then sucked through evaporator 25 and heater core 26. Depending on the mode or set-point of the cab temperature, heater core 26 or evaporator 25 is heating up or cooling down the air stream. Finally, the main blower 23 pushes the HVAC output air to the distributors 27 and 28.

The ratio between fresh air and recirculated air in this embodiment is mainly regulated (in a new condition without significant filter load) by the ratio of the speeds of the pressurization blower 22 and the main blower 23. If the pressurization blower 22 is switched off or is not operating, a main blower 23 with sufficient performance can still be capable of sucking in fresh air. Thus the system can still meet the legal requirement to add fresh air to the cab in certain conditions to ensure air quality (to avoid suffocation and to control the CO ratio). The use of two blowers ensures that even if the filter is very dirty and the pressure drop is increasing adequate air exchange can still be obtained.

The present invention also provides a means for emptying water, dust and other debris which has been drawn into the roof rear pillars 16. To this end the lower ends of the rear pillars are provided with rubber/plastics sealing valves or teats 60 (see FIG. 14) which have flaps 61 which define a slot 62 therebetween and which are normally drawn towards each other by the low pressure created within the pillars to seal the lower ends of the pillars during use of the HVAC system.

Figure 2:
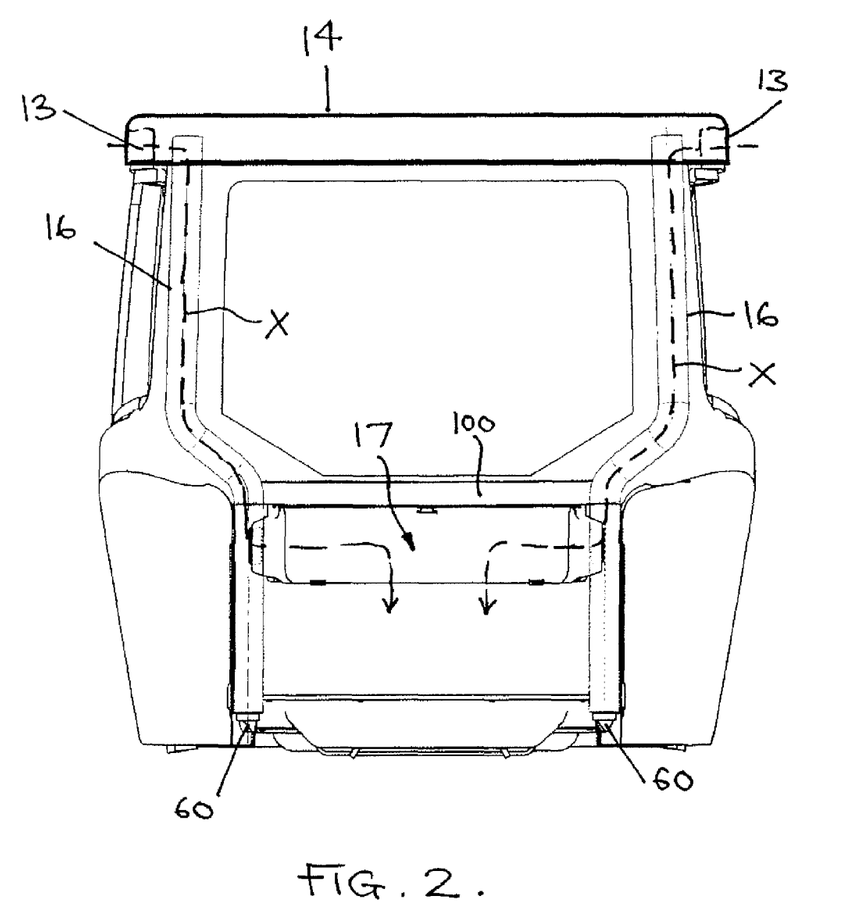
FIG. 2 show a rear view of the cab of FIG. 1.
Figure 3:
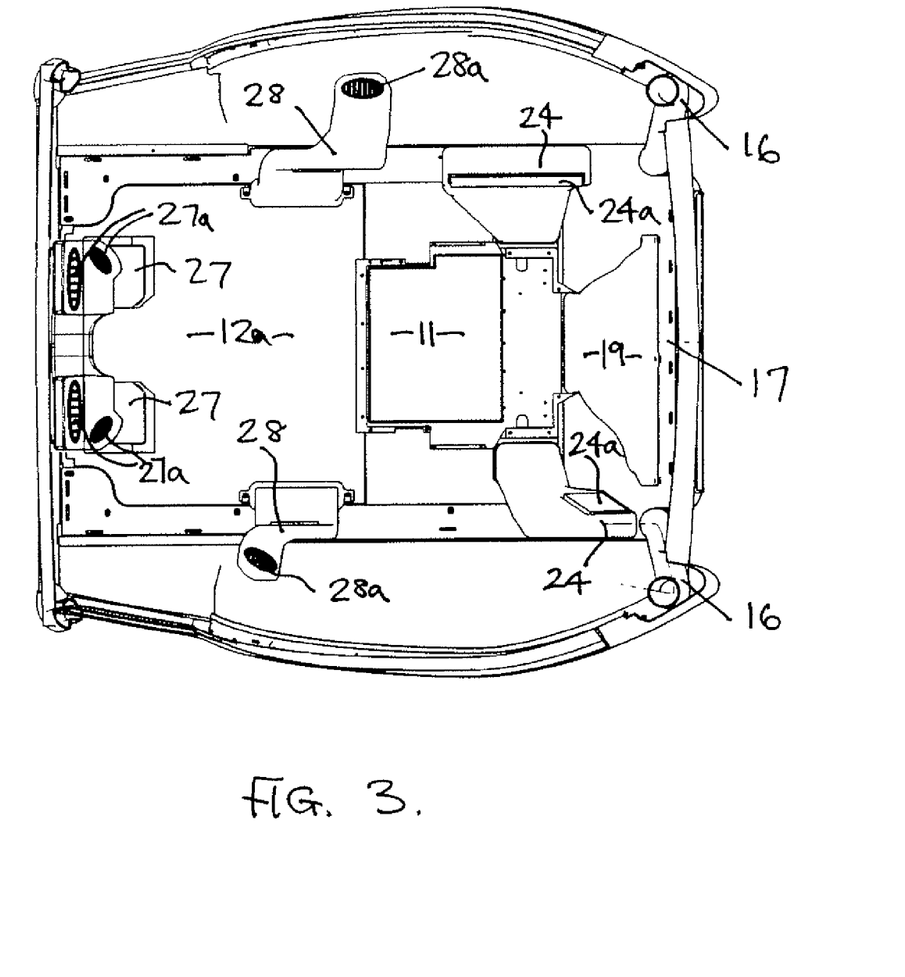
FIG. 3 shows a section on the line A-A of FIG. 1.
Figure 4:
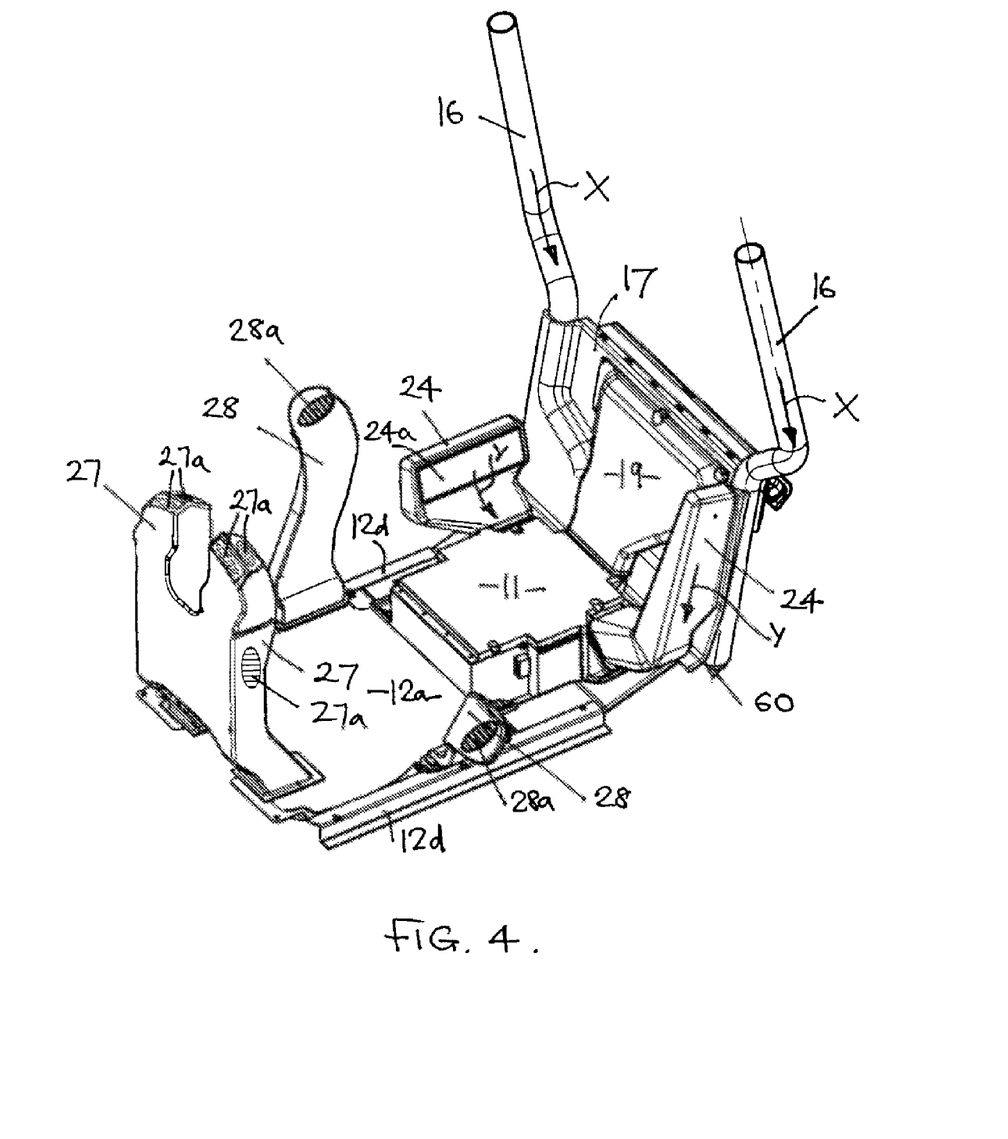
FIG. 4 shows a perspective view of part of the lower part of the cab of FIG. 1.
Figure 14:
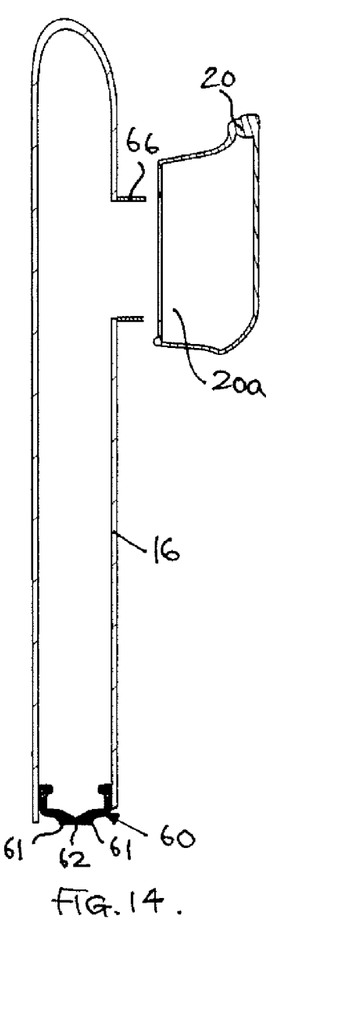
FIG. 14 shows a section on line E-E of FIG. 13.
Figure 15:
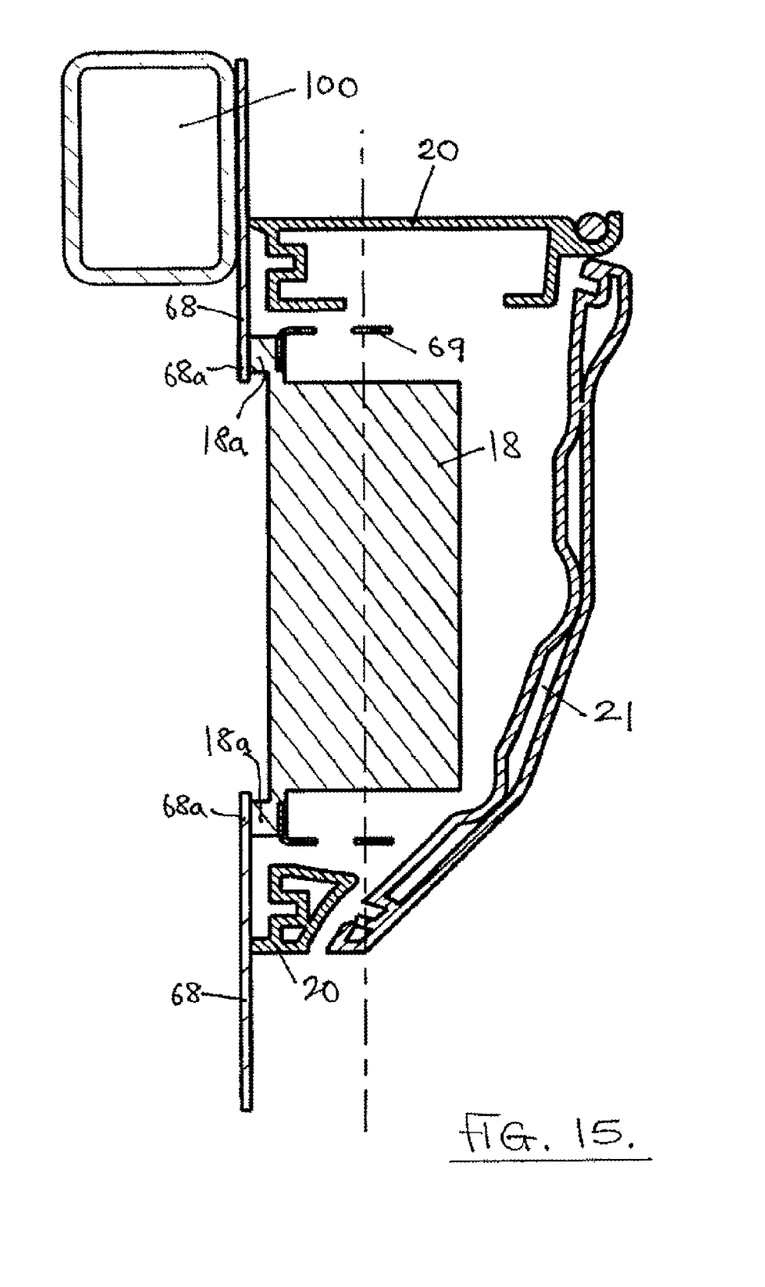
FIG. 15 shows a section on line similar to line F-F of FIG. 12.

As can be seen from FIGS. 2 and 14, the air flow travels down the pillars 16 and executes a right angle turn as it enters the filter housing. Thus any water drops, dust or other debris which is in this air stream is relatively dense compared to the air and therefore tends to carry straight-on past the entry into the filter housing and to collect in the lower ends of the pillars above the flaps 61 of the sealing teats/valves 60. If the weight of water, dust or other debris resting on the teats/valves 60 is exceeding a certain level, or overpressure of the cab occurs by slamming the door, the slots 62 between the flaps 61 are opened and thus the water, dust or debris is flushed or discharged. Alternatively, to empty this water, dust or debris the tractor operator simply squeezes the rubber/plastic sealing teats to open the slots 62 between the flaps 61 and allow the water, dust and debris to fall from the pillars.

In an alternative construction (not shown) the lower ends of the pillars 16 may be closed-off by spring loaded pivoting flaps (instead of teats 60) which are again opened either manually, or by the weight of the water, dust or debris which has collected above the flaps, or by over pressurisation of the cab when the door is slammed.

Figure 17:
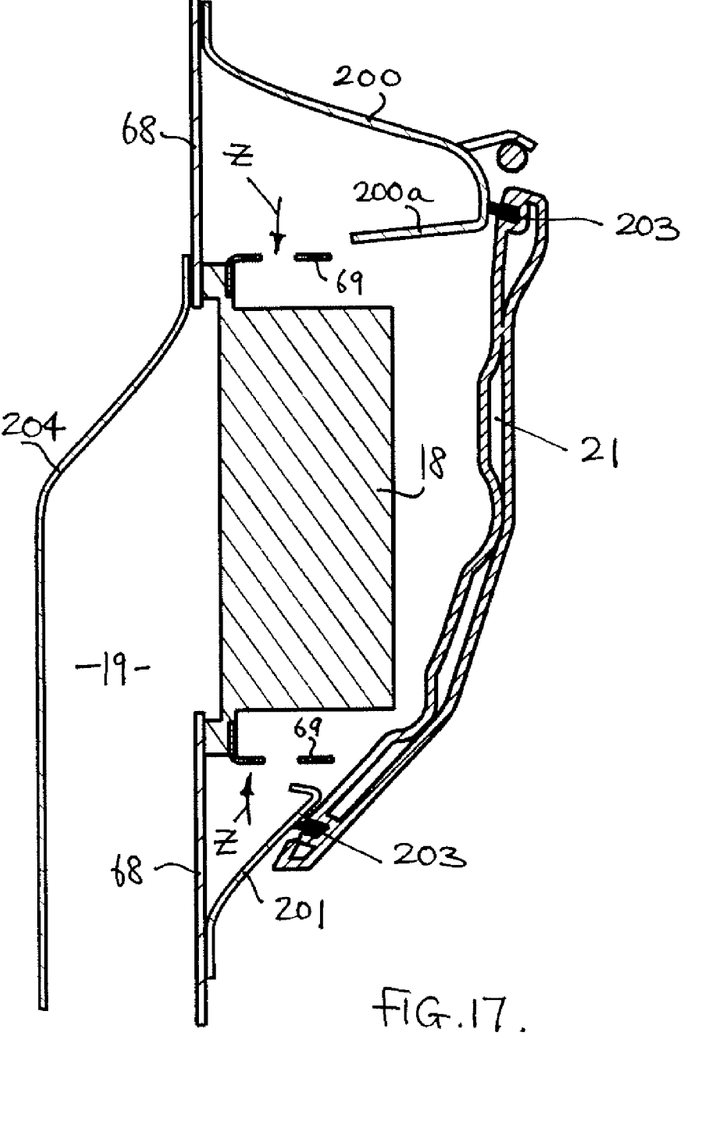
FIGS. 17 and 18 show equivalent views to FIGS. 15 and 13 of a further alternative filter housing construction.
Figure 18:
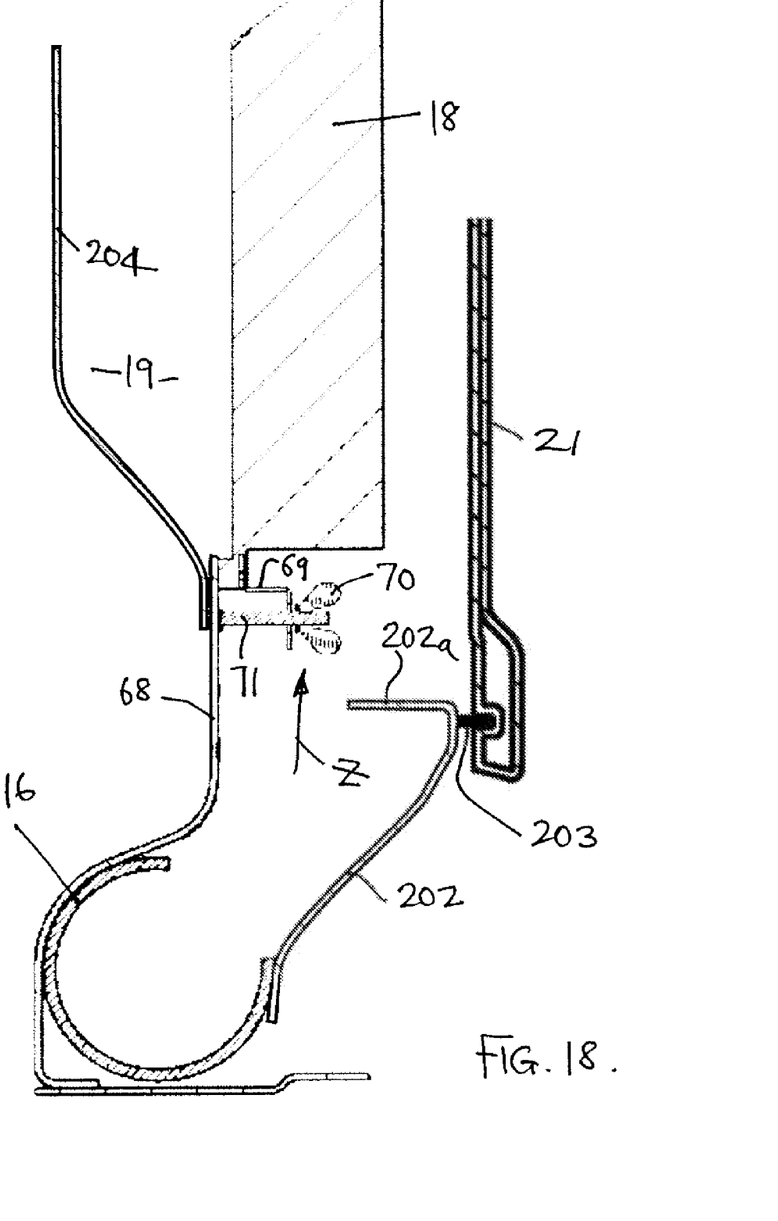

FIGS. 17 and 18 show a further alternative construction in which the filter housing is formed by metal components 200, 201 and 202 which are welded to the rear panel 68 or pillars 16 of the cab. The door 21 which is of plastics material seals to the housing at 203. Components 200, 201 and 202 have stiffening flanges 200a, 201 a and 202a respectively which may extend back to (and be welded to) the rear panel 68. Flanges 200a, 201a and 202a are provided with openings to allow air to travel in direction Z of FIGS. 17 and 18.

FIGS. 17 and 18 also show a further alternative which is the use of a sheet metal member 204 which, in conjunction with the rear panel 68, defines the duct 19 from the filter housing to the HVAC unit 11. This construction can be used in place of a duct 19 which is completely separate from rear panel 68.

The invention claimed is:

1. A tractor cab HVAC system having a blower which draws air into the system via air intakes positioned in two sides of a roof of the cab, ducting in the roof of the cab which directs air drawn in via the intakes down two hollow pillars positioned in rear sides of the cab to an air filter contained in a housing located between the pillars, further ducting extending from the air filter housing to an HVAC unit, the HVAC unit processing the air drawn into the system prior to discharging the processed air into the cab, the filter housing being of generally rectangular form and extending across the cab below a rear window of the cab and being connected at opposite ends to bottom ends of the two rear hollow pillars of the cab via inlet openings in the housing to allow the passage of intake air from the pillars to the filter, wherein the bottom ends of the hollow rear pillars of the cab have outlets through which water and dust/debris which is drawn in via the intake means can be emptied from the pillars, in which the outlets are closed off by flexible sealing teats which can be opened to release any water, dust or other debris which has collected in the pillars above the teats, the filter housing also having a door through which the filter can be accessed for maintenance.

2. A system according to claim 1 in which sealing means surround each inlet opening in the filter housing and seal the housing to air outlets in the hollow adjacent pillars of the cab.

3. A system according to claim 1 in which the filter is clamped against a sealing surface which surrounds an outlet aperture of the filter housing.

4. A system according to claim 3 in which a frame clamps a circumferential seal on the filter against the sealing surface.

5. A system according to claim 1 in which the housing is a plastics moulding.

6. A tractor cab HVAC system having a blower which draws air into the system via air intakes positioned in two sides of a roof of the cab, ducting in the roof of the cab which directs air drawn in via the intakes down two hollow pillars positioned in rear sides of the cab to an air filter contained in a housing located between the pillars, further ducting extending from the air filter housing to an HVAC unit, the HVAC unit processing the air drawn into the system prior to discharging the processed air into the cab, the filter housing being of generally rectangular form and extending across the cab below a rear window of the cab and being connected at opposite ends to bottom ends of the two rear hollow pillars of the cab via inlet openings in the housing to allow the passage of intake air from the pillars to the filter, wherein the bottom ends of the hollow rear pillars of the cab have outlets through which water and dust/debris which is drawn in via the intake means can be emptied from the pillars, in which the outlets are closed off by spring-loaded flap valves which are opened against the spring-loading to release any water, dust or other debris which has collected in the pillars above the flap valves, the filter housing also having a door through which the filter can be accessed for maintenance.

7. A system according to claim 1 in which on leaving the HVAC unit the air passes through a hollow floor of the cab before entering the cab via outlets in the floor of the cab.

* * * * *